United States Patent [19]
Ozeki et al.

[11] Patent Number: 5,838,404
[45] Date of Patent: Nov. 17, 1998

[54] DISPLAY DEVICE WITH OPTICAL MEMBER HAVING TWO PARTS IN OVERLAY RELATION TO REFLECT LIGHT INCIDENT AT PARTICULAR ANGLE

[75] Inventors: Masao Ozeki; Yoshinori Hirai; Yoshiharu Ooi, all of Yokohama, Japan

[73] Assignee: Asahi Glass Company Ltd., Tokyo, Japan

[21] Appl. No.: 535,061

[22] PCT Filed: Mar. 1, 1995

[86] PCT No.: PCT/JP95/00321
    § 371 Date: Nov. 1, 1995
    § 102(e) Date: Nov. 1, 1995

[87] PCT Pub. No.: WO95/23996
    PCT Pub. Date: Sep. 8, 1995

[30] Foreign Application Priority Data

Mar. 1, 1994 [JP] Japan ..................................... 6-031589

[51] Int. Cl.⁶ ............................. G02F 1/1335; G02B 6/10
[52] U.S. Cl. .................................. 349/65; 349/62; 349/57; 385/146
[58] Field of Search .................................. 349/62, 65, 49, 349/57; 385/146

[56] References Cited

U.S. PATENT DOCUMENTS

| | | | |
|---|---|---|---|
| 3,838,909 | 10/1974 | Fitzgibbons | 349/62 |
| 4,726,662 | 2/1988 | Cromack | 349/57 |
| 5,206,746 | 4/1993 | Ooi et al. | 349/62 |
| 5,485,354 | 1/1996 | Ciupke et al. | 349/62 |
| 5,600,455 | 2/1997 | Ishikawa et al. | 349/65 |

FOREIGN PATENT DOCUMENTS

| | | |
|---|---|---|
| 3033141 | 3/1982 | Germany . |
| 0 421 810 | 10/1991 | United Kingdom . |

*Primary Examiner*—Anita Pellman Gross
*Assistant Examiner*—Tarifur R. Chowdhury
*Attorney, Agent, or Firm*—Oblon, Spivak, McClelland, Maier & Neustadt, P.C.

[57] ABSTRACT

The display device using a transparent-scattering type liquid crystal element has such a structure that the light quantity to an observer is controlled as possible when a black image is provided, and a high efficiency of light is maintained in comparison with the conventional technique when a white image is provided. A prism array 2 is disposed at the back surface of the transparent-scattering type display element so that a sawteeth-like surface of the prism array 2 faces the display element 1, and a light absorber 3 is disposed at the back surface of the prism array.

3 Claims, 5 Drawing Sheets

DISPLAY DEVICE WITH OPTICAL MEMBER HAVING TWO PARTS IN OVERLAY RELATION TO REFLECT LIGHT INCIDENT AT PARTICULAR ANGLE

TECHNICAL FIELD

The present invention relates to a display device using a transparent-scattering type display element whose light scattering characteristics are changed in response to an external input.

BACKGROUND ART

Heretofore, a liquid crystal display element has been well known as a display element whose optical characteristics are changed in response to an external input. In particular, as a liquid crystal optical element in wide practical use, there is a twist nematic (TN) type liquid crystal optical element in which a pair of polarization films are attached to both sides of a liquid crystal display cell, which is used as a display element for a watch, a portable calculator, a word processor, a personal computer or the like.

However, the TN type liquid crystal optical element has such a drawback that when a high contrast ratio is to be obtained by increasing the polarizing property of the polarization films, light loss becomes large and a dark image is provided.

In recent years, use of a transparent-scattering type liquid crystal optical element has been noted. The transparent-scattering type liquid crystal optical element controls the switching between a transparent state and a scattering state by receiving an external input wherein an incident light is allowed to pass through without a substantial change of the direction of the incident light in the transparent state, while the incident light is scattered in the scattering state. Since the element does not need the polarization films, light loss is small and is suitable for providing a light image. Heretofore, a liquid crystal optical element of dynamic scattering mode (DSM) has been mainly used as the transparent-scattering type liquid crystal optical element. However, the element using a liquid crystal and cured material matrix composite has been recently proposed.

When the transparent-scattering type liquid crystal display element is used for a direct viewing type, a light absorption plane is often arranged at the back side of the transparent-scattering type display element. This is because an observer directly sees the light absorption plane in the transparent state, and accordingly, a dark image (black) is provided, while light is scattered in the scattering state, and accordingly, a light image (white) is provided.

In this case, however, the white image is very dark because when light is scattered in the transparent-scattering type display element, the quantity of light scattered forwardly with respect to the direction of light incidence is generally greater than the quantity of light scattered backwardly. The substantial portion of the forwardly scattered light is absorbed by the light absorption plane and is not returned to the observer. Accordingly, the quantity of light which the observer can observe when a white image is displayed is small.

In view of the above-mentioned problems, there have been proposed several methods wherein the observer takes as if the backwardly scattered light is increased by returning the forwardly scattered light caused by the transparent-scattering type display element to the same.

For instance, Japanese Unexamined Patent Publication No. 81797/1975, U.S. Pat. No. 476,662, Japanese Unexamined Patent Publication No. 333330/1993 or Japanese Unexamined Patent Publication No. 165330/1992 describes that a prism having a light absorption plane at a part of the surface is arranged at the back side of the transparent-scattering type display element.

Figure 6:
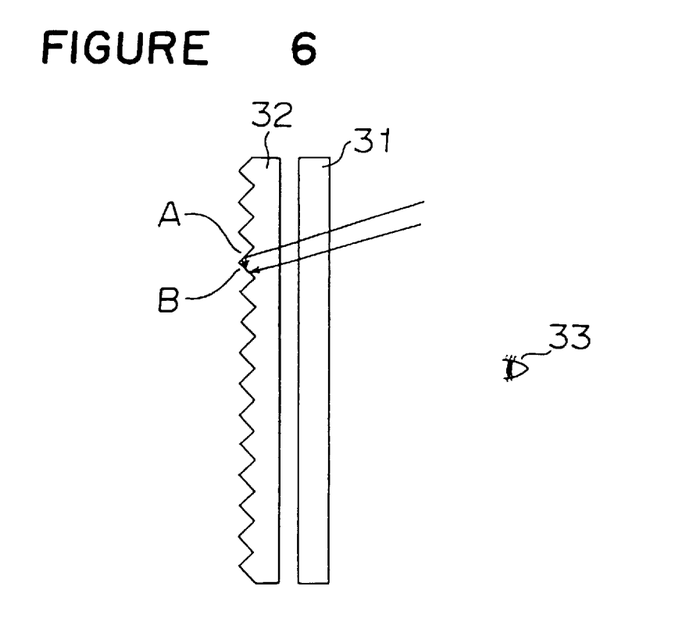
FIG. 6 is a schematic view illustrating a conventional example.

FIG. 6 is a schematic cross-sectional view based on the description in U.S. Pat. No. 476,662. In the figure, an A face is a non-absorption face and a B face is an absorption face. Among the lights passed through the transparent-scattering type display element 31 from the side of an observer 33, light directing to the B face of the prism array 32 is absorbed by the B face. Further, among the lights directing to the A face of the prism array 32, light which satisfies the total reflection is absorbed by the B face after reflection. The other lights transmit through the A face. By arranging a reflection plate or a diffusion plate at the back side of the prism, the observer substantially sees the absorption face (black) at the time of transmission of light, and sees scattering light (white) which is not absorbed at the time of scattering.

However, these structures involve various problems. For instance, since the surface area of the light absorption portion is limited, the light irradiating the portion other than the light absorption portion returns to the side of the observer at the time of displaying the black image. Accordingly, the degree of darkness is low at the time of displaying the black image, and accordingly, the contrast ratio cannot be increased.

Further, since the efficiency of returning the light, which has transmitted through the A face, to the A face again is low, the efficiency of utilizing light at the time of displaying a white image is low, and a light display cannot be obtained. Further, since a treatment for forming the B face of the prism to be the absorption face has to be conducted with accuracy and in a large quantity, productivity is inferior.

The Japanese Unexamined Patent Publication No. 121485/1987 describes such a structure that the surface area of the light absorption portion is limited and the light passing through the element is collected to the light absorption portion. In more detail, there are two proposals: 1) A concave cylindrical mirror in an array form is arranged at the back side of the transparent-scattering display element, and a light absorption means is disposed in the vicinity of the focal point of the concave cylindrical mirror, and 2) a cylindrical lens is disposed at the back side of the transparent-scattering type display element; a light absorption means is disposed in the vicinity of the focal point of the element, and a scattering body or a reflector is disposed at the back side of the light absorption means.

However, these structures cannot always utilize light satisfactorily. In these structures, the reflection means is disposed at the opposite side of an observer with respect to the liquid crystal display element, and the light absorption means is disposed between the reflection means and the liquid crystal display element. Accordingly, light directing to a direction other than a specified viewing angle direction is partly absorbed, and accordingly, light utilization efficiency is not sufficient. Further, there are such problems that complicated processes are necessary to prepare the concave cylindrical mirror in an array form or the cylindrical lens, and productivity is poor because the arrangement of the optical elements has to be made strictly.

As measures to obtain a bright white image, a method of using in association an illumination disposed at the opposite side of an observer is proposed.

In a case that an illumination disposed at the opposite side of the observer is used together, it is an important problem to reduce the quantity of light reaching the side of the observer at the time of providing a black image in order to increase the contrast ratio. For this purpose, there has been proposed to arrange a louver at the back side of the transparent-scattering type display element.

The louver has such a property as to absorb light other than the light passing in substantially parallel to the direction to be restricted. Accordingly, when the louver is arranged between a light source and the transparent-scattering type display element, an illuminating light substantially parallel to the specified direction can be obtained.

By utilizing the nature of the louver and by arranging the transparent-scattering type optical element so that the direction of the transmittance of the illuminating light is out of the viewing angle of the observer, a monochrome image can be realized. When the transparent-scattering type optical element is in a transparent state, light does not substantially reach the observer and a black image is provided. On the other hand, when the transparent-scattering type optical element is in a scattering state, scattered illuminating light reaches the observer and a white image is provided.

However, in this structure, it is impossible to increase the efficiency of utilizing light because the amount of light absorbed by the side face of the louver, when the light passes through the louver, is large, and forwardly scattering light among the lights entering from the side of the observer is not satisfactorily utilized. Further, there is a problem that it is difficult to make the structure of the louver thin.

Further, Japanese Unexamined Patent Publication Nos. 121485/1987 and 81797/1975 propose that a light source is disposed at the back side of a cylindrical lens or a prism. In this structure, however, since the light passing in the direction of the viewing angle is absorbed, the efficiency of utilizing light is low.

DISCLOSURE OF INVENTION

The present invention relates to a display device using a transparent-scattering type liquid crystal optical element and proposes a structure that an amount of light reaching an observer is controlled as possible when a black image is provided, and the efficiency of utilizing light can be maintained as high as possible in comparison with the conventional technique when a white image is provided.

The present invention is to provide a display device which comprises a transparent-scattering type display element in which the light scattering characteristics are changed in response to an external input, an optical member disposed at the back side of the transparent-scattering type display element, which substantially transmits light which passes through the transparent-scattering type display element within a predetermined range of incident angle, and substantially reflects the other light, and a light absorber disposed at the back side of the optical member.

In a preferred embodiment of the display device of the present invention, a second interface is a flat interface, and a first interface is a wavy interface wherein the angle with respect to the second interface is periodically changed. In particular, the first interface is a sawtooth-like interface and the second interface is the flat interface. More preferably, a prism array in which the sawtooth-like portion is so arranged as to face the side of the transparent-scattering type element is used.

According to an aspect of the present invention, an optical member is disposed at the back side of the transparent-scattering type display element so that it substantially transmits light entering to the element within a predetermined range of angle among lights passing through the transparent-scattering type display element, and substantially reflects the other light. Further, a light absorber is disposed at the back side of the optical member. Accordingly, it is possible to reflect light having the direction other than a specified viewing angle direction at the time of providing a white image, whereby the efficiency of utilizing light can be increased by the re-use of light.

On the other hand, according to an aspect of the present invention, a light absorbing means is so disposed as to extend over the substantially entire surface of the optical element. Accordingly, the reaching of light to the observer is controlled at the time of providing a black image, and accordingly, a display device having a high contrast ratio is obtainable.

Further, according to an aspect of the present invention, the optical member has a first interface and the second interface in this order from a side of the transparent-scattering type display device wherein the first interface is to deflect the direction of at least part of light among incident lights so that the angle formed in association with the display surface of the transparent-scattering type display device is small, and the second interface is to substantially reflect light entering from the direction that the angle formed in association with the transparent-scattering type display device is smaller than the predetermined angle, while it substantially transmits the other light. This enables the total reflection of a part of light entering into the optical member at the second interface. Further, there is an advantage that an amount of reflected light at the second interface can be adjusted by controlling the shape of the first interface.

Further, in an aspect of the present invention, the brightness of a white display can be further increased since a light source is disposed at a side face of the optical member. On the other hand, light from the light source is not substantially absorbed by the light absorber since the optical member can function as a light guide. Accordingly, a high efficiency of utilization of light can be maintained when a white image is to be provided, and the light is introduced to the outside of the eyesight of an observer when a black image is to be provided, whereby the reduction of the darkness of the black image can be prevented.

Further, in an aspect of the present invention, the transparent-scattering type display element comprises a liquid crystal-cured material matrix composite having a high ON-OFF ratio of transparent and scattering, and accordingly, the contrast ratio of the display device can be increased.

Further, the present invention is to provide a display device which comprises a transparent-scattering type display element in which the light scattering characteristics are changed in response to an external input, an optical member disposed at the back side of the transparent-scattering type display element, which substantially transmits light which passes through the transparent-scattering type display element within a predetermined range of incident angle, and substantially reflects the other light, a light absorber disposed at the back side of the optical member and a light source disposed at a side surface of the optical member, whereby at least part of light emitted from the light source is caused to enter into the inside of the optical member from the side surface of it, and at least part of the light which has entered into the optical member is caused to emit through a surface of the optical member.

In an aspect of the invention described just above, the optical member has a first interface and a second interface in this order from the side of the transparent-scattering type display element, wherein the first interface is to deflect the direction of at least part of light among incident lights so that the angle formed in association with the display surface of the transparent-scattering type display element is small, the second interface is to substantially reflect light entering from the direction that the angle formed in association with the transparent-scattering type display element is smaller than a predetermined angle, while it substantially transmits the other light, and at least part of the incident light which has entered into the optical member is caused to emit through the first interface.

In an aspect of the above-mentioned invention, the optical member is a prism array having first and second interfaces wherein the first interface is a wavy interface in which the angle to the second interface is periodically changed.

Further, in an aspect of the above-mentioned invention, the light source is arranged at a side surface of the prism array at a position to intersect the extension of the wavy surface having a periodical change.

Further, in an aspect of the above-mentioned invention, the optical member comprises two parts in overlaying relation and the light source is arranged at a side surface of at least one part.

Further, in an aspect of the above-mentioned invention, a reflector is disposed at either side surface of the optical member except for the side surface from which light of the light source enters.

Further, in an aspect of the invention, a light source is provided at a side surface of the optical member and a reflector is provided to cover the light source so that the major portion of light emitted from the light source is introduced to the side surface of the optical member, whereby a very bright display is obtainable and a display device having a thin thickness can be achieved. It is because the light which is emitted from the light source to enter into the optical member and which is emitted through the first interface, has a wide angle of ±70° with respect to the vertical direction of the display surface. Accordingly, the light is effectively supplied to the display element.

Further, in a preferred embodiment of the invention, two prism arrays each having the first interface of a saw-tooth form are arranged with their periodically changed angle portions crossing in perpendicular to each other.

BEST MODE FOR CARRYING OUT THE INVENTION

Figure 1:
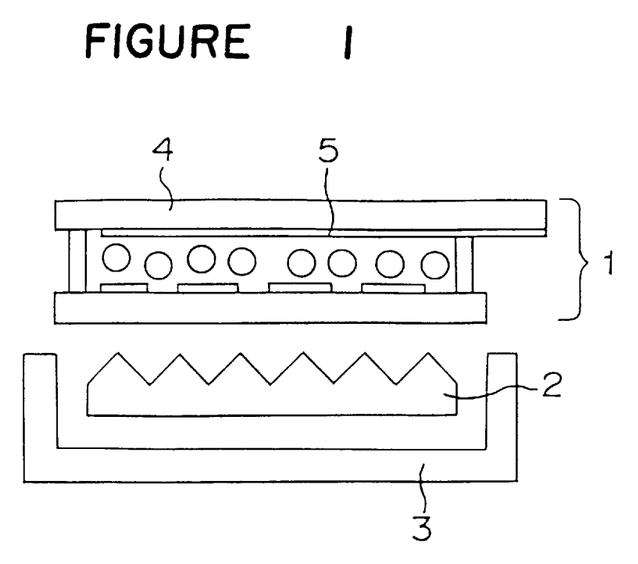
FIG. 1 is a cross-sectional view showing an embodiment of the display device of the present invention.

In the following, an embodiment of the present invention will be described with reference to drawings. FIG. 1 is a diagram showing a concrete example of a structure according to the present invention. A prism array 2 is disposed at the back side of a transparent-scattering type display element 1. The prism array 2 is disposed with the sawtooth-like face directing to the transparent-scattering type display element 1. Further, a light absorber 3 is disposed at the back side of the prism array 2.

The prism array 2 is an optical member which substantially transmits light which passes through the transparent-scattering type display elements within a predetermined range of incident angle, and substantially reflects the other light where a predetermined range of incident angle means a range estimated by an observer as a range of viewing angle.

Figure 4:
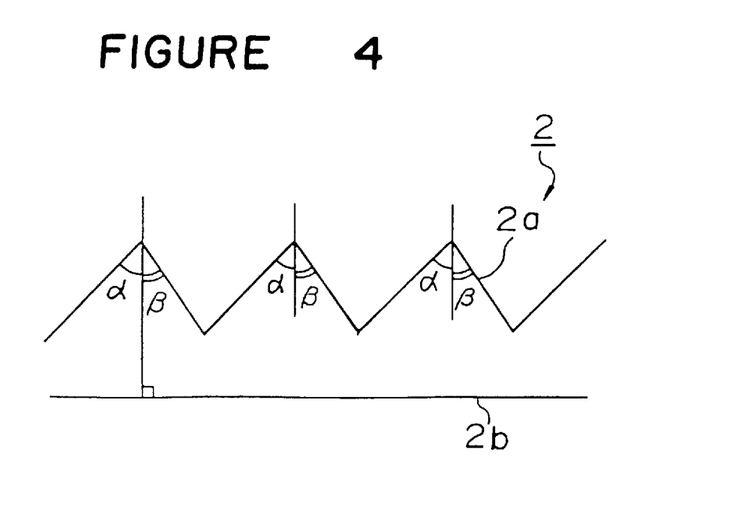
FIG. 4 is a cross-sectional view of another embodiment of the prism array used for the present invention.
Figure 5:
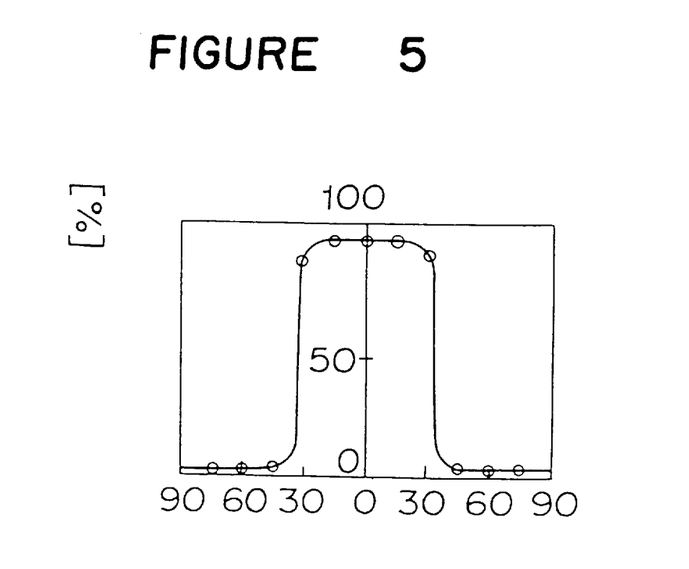
FIG. 5 is a graph showing light transmittance to incident angle to the prism array used for the present invention.

FIG. 5 is a diagram showing the transparent characteristic of an incident light which enters from the side of the sawtooth-like interface 2a, see FIG. 4 also, of the prism array at an inclination angle θ with respect of the vertical direction. FIG. 5 shows a case that the refractive index of material for the prism array is n=1.59 and the vertical angle of the prism is 90° in a symmetric shape. When light is incident from the side of the sawtooth-like interface 2a of the prism array 2 at a substantially vertical direction with respect to a flat interface 2b of the prism array, the prism array 2 allows the substantial amount of light to pass through. However, when light enters from the side of the sawteeth-like interface 2a of the prism array 2 at an inclination angle exceeding a predetermined angle with respect to the flat interface 2b of the prism array 2, the flat interface 2b of the prism array 2 reflects the substantial amount of light so that the light is returned to the transparent-scattering type display element 1.

In combination of the optical member with the light absorber 3, a member having such a property that light entering from the direction having a specified range is absorbed and light entering from the direction of the other range is reflected, can be prepared.

In the construction shown in FIG. 1, an observer sees the light absorber 3 when the transparent-scattering type display element 1 is in a transparent state and sees a very bright scattering light in a scattering state.

When the transparent-scattering type display element 1 is in a transparent state and the viewing angle of the observer is within a predetermined angular range wherein light transmits through the prism array 2, the light is not reflected by the prism array 2 in view of the observer and reaches the light absorber 3, whereby the observer observes the light absorber 3. For instance, when a black light absorber 3 is used, the observer sees black.

On the other hand, when the transparent-scattering type display element 1 is in a scattering state, light entering from the side of the observer is backwardly scattered in some amount and the backwardly scattered light reaches the observer directly. However, a great amount of light is forwardly scattered. Among lights forwardly scattered, light entering into the prism array 2 at an angle causing reflection by the prism array 2 is reflected to be returned again to the transparent-scattering type display element 1. A great amount of light returned to the transparent-scattering type display element 1 is again scattered forwardly. Thus, the observer will take as if there is scattering light as a whole in the combination of the light backwardly scattered directly, and the light forwardly scattered by the transparent-scattering type display element 1, which has been reflected by the prism array 2, which has been forwardly scattered by the transparent-scattering type display element 1.

Accordingly, the scattered light seen by the observer when the transparent-scattering type display element 1 is in a scattering state, is very bright.

The present invention provides a high efficiency of utilization of light in comparison with the conventional technique. In the conventional technique, since a reflection plate or the like is disposed outside of the light absorber, the entire amount of light satisfying a predetermined incident angle is not returned to the transparent-scattering type optical display element, and efficiency of utilization of light is reduced. On the other hand, in the present invention, since a reflecting function takes place on the optical member at the front of the light absorbing means, the substantial amount of light satisfying the predetermined incident angle can be returned to the transparent-scattering type optical display element, and the efficiency of utilization of light is high.

Further, by arranging the light absorbing plate 3 so as to cover substantially an entire surface of the transparent-scattering type display element 1 as shown in FIG. 1, an amount of light leaking when the transparent-scattering type display element 1 is in a transparent state is very small, and the contrast ratio of a display can be increased.

The light absorbing plate 3 can be used as long as it absorbs a specified wavelength, depending on the specification of a display. For instance, in order to enable a monochrome display, a black paper, a black cloth, a black film and so on which absorbs visible light, may be used. Further, an anti-reflection coating may be formed on the light incident surface of the absorbing plate to increase the absorption rate.

FIG. 1 shows the prism array 2 as an example of the optical member which substantially transmits light entering within a specified range of angle and substantially reflects light entering within the other range of angle.

However, the arrangement of the prism array 2 as shown in FIG. 1, is very preferable as the optical member of the present invention from the viewpoint that the prism array has a first interface and a second interface in this order from the side of the transparent-scattering type display element wherein the first interface is to deflect the direction of at least part of light among incident lights so that the angle formed in association with the display surface of the transparent-scattering type display element is small, and the second interface substantially reflects light entering from the direction that the angle formed in association with the transparent-scattering type display element is smaller than a predetermined angle, while it substantially transmits the other light. With such a structure, an amount of reflected light at the second interface can be adjusted by controlling the shape of the first interface.

Figure 8A:
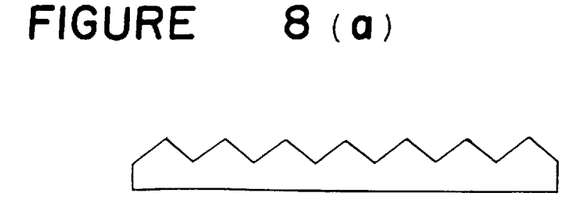
FIGS. 8(a) and 8(b) are cross-sectional views showing a preferred embodiment of an optical member used for the present invention.
Figure 8B:
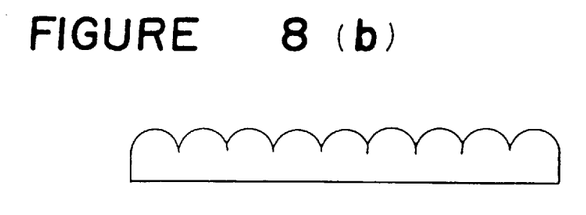
Figure 8C:
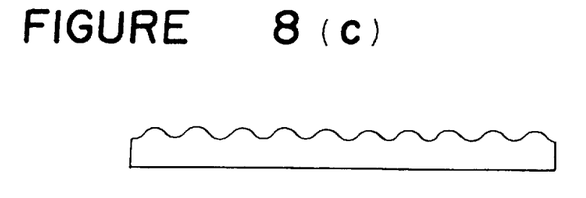

As a specific example of the optical member of the present invention, it is in particular preferable to have such a structure that the second interface is a flat interface and the first interface is a wavy interface, wherein the angle with respect to the second interface is periodically changed. FIG. 8 shows examples having such feature. FIG. 8a shows a so-called prism array wherein the first interface is in a triangular wave form; FIG. 8b is a cylindrical lens-type array wherein the first interface is formed with the periodical repetition of a circular arc; and FIG. 8c shows an array wherein the first interface is in a sine-wave form.

Among these arrays, the prism array is in particular preferable since it is easy to control the shape of the first interface. In the following, the performance of the prism array will be described. The sawtooth-like interface of the prism array functions as the first interface and the flat interface functions as the second interface.

In the present invention, the thickness of the wavy interface is about 200–300 μm, also the total thickness of the prism array is about 3200–3300 μm (3000 μm is used approximately as light guide).

Figure 3:
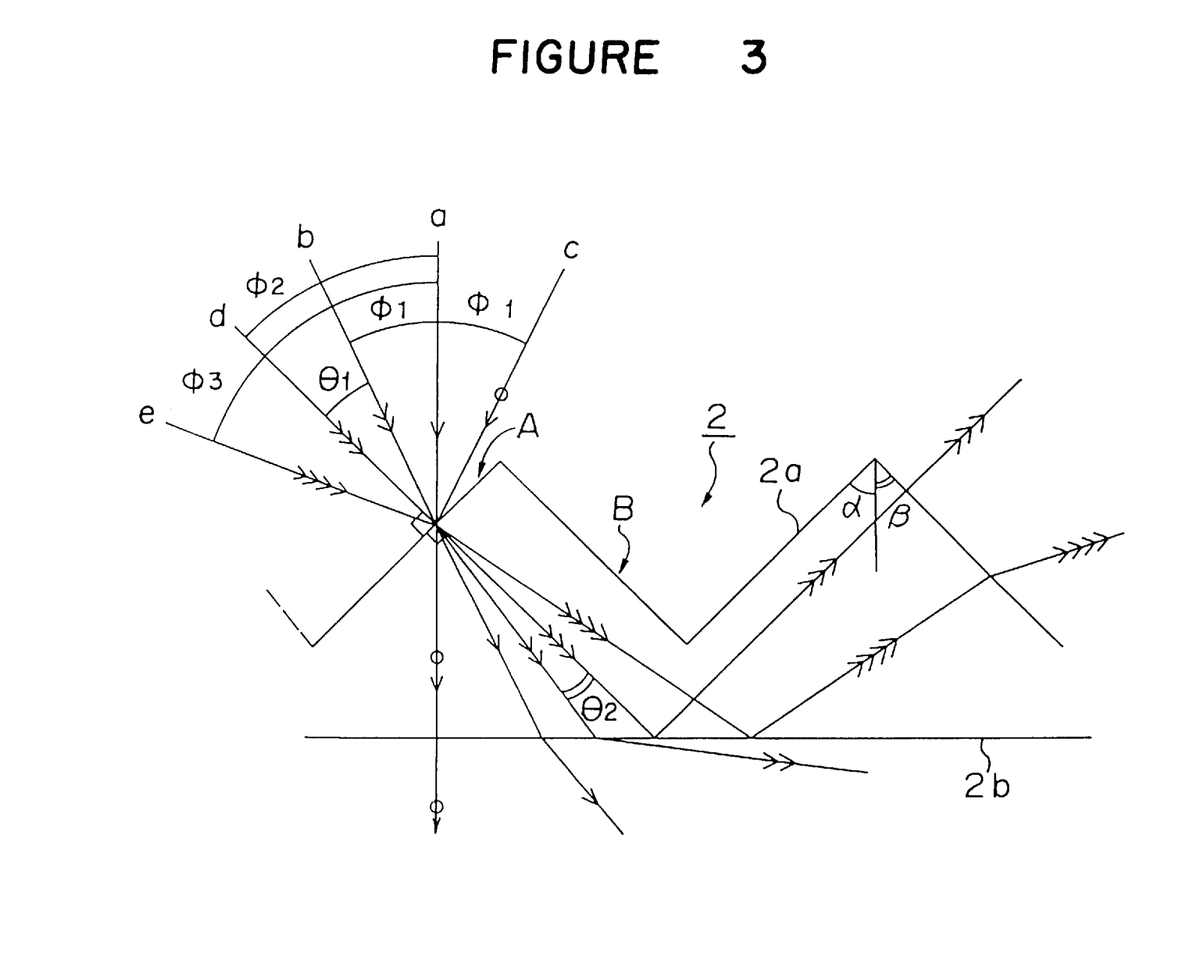
FIG. 3 is a cross-sectional view showing locuses of light to a prism array used for the present invention.

FIG. 3 shows a cross-sectional view of the prism array in which locuses of light beams are shown. Assuming that an incident angle of light to the prism array 2 of a refractive index n is $\theta_1$ and an emission angle of light in the prism array 2 is $\theta_2$, Snell's law of $$n_0 \cdot \sin \theta_1 = n \cdot \sin \theta_2$$

is established wherein $n_0$ is the refractive index of air. Namely, the light having an incident angle $\theta_1$ is refracted at an angle $\theta_2$.

Light entering from the side of the sawtooth-like interface of the prism array 2 is refracted at the sawtooth-like interface 2a to reach the flat interface 2b of the prism array. When the incident angle to the flat interface 2b is large, the transmission of light does not take place and only the reflection occurs. The condition satisfying such phenomenon is the total reflection condition. When light in the prism array 2 is incident into the flat interface 2b at an incident angle $\theta_3$, the following formula is provided:

$$n_0 = n \cdot \sin \theta_3$$

When light is incident to the flat interface 2b at an incident angle greater than $\theta_3$, the total reflection occurs.

Now, the behavior of the deflection of light entering into the prism array depending on incident angles will be considered. Assume that, in FIG. 3, light beams a–e respectively enter into the face A of the sawtooth-like interface 2a of the prism array 2.

Light beams a–c have a viewing angle in a range of with respect to the substantially vertical direction when the transparent-scattering type display element is in a transparent state, and finally transmit the prism array 2. The light beams a and b are so deflected as to enter into the flat interface 2b of the prism array 2 at a larger incident angle but they are insufficient to enter at the total reflection angle. The total reflection of the light beam c does not take place since it is so deflected as to enter into the flat interface 2b of the prism array 2 at a smaller incident angle.

Light beams d and e have a viewing angle of $\phi_2$ or $\phi_3$ with respect to the substantially vertical direction when the transparent-scattering type display element is in a transparent state, and they are finally reflected in the prism array 2. Since the light beams d and e are so deflected as to enter into the flat interface 2b of the prism array 2 at a larger incident angle, it exceeds the total reflection angle.

There is a case that one of the light beams b and c is reflected and the other transmits depending on the magnitude of the vertical angle of the prism array 2 even though the light beams b and c have the same viewing angle $\phi_1$. This result because the light beam b is so deflected as to enter into the flat interface 2b of the prism array 2 at a larger incident angle, and on the other hand, the light beam c is so deflected as to enter into the flat interface 2b of the prism array 2 at a smaller incident angle.

However, the light beam c little influences the transmission-reflection characteristics of light satisfying the viewing angle $\phi_1$ because the incident angle of the light beam c facing the face A of the sawtooth-like interface 2a is small. In a case that the light beam c enters into the face B, a facing angle to the face B is large. However, it is clear that the locus of the light beam c incident into the face B is substantially symmetric with the light beam b incident into the face A. Accordingly, they have similar transmission-reflection characteristics.

Generally, the first interface (the sawteeth-like interface 2a) is sufficient to deflect the direction of at least part of light, among lights entering at an arbitrary angle, to the direction in which the reflection is apt to occur at the second interface. In the above-mentioned example, the light beams a, b, d and e incident into the face A are deflected to the direction in which the reflection is apt to occur at the second interface. Thus, the angular range of reflection at the second interface can be substantially increased. The transmission-reflection characteristics of the prism array shown in FIG. 5 is thus obtainable. In this case, the transmission-reflection characteristics are remarkably changed at a viewing angle exceeding slightly 30°.

The light deflected in the direction in which the reflection is apt to occur at the second interface may be a part of light having an arbitrary incident angle because it is sufficient that there is an increase in reflecting component at the second interface. In the above-mentioned example wherein the first interface is in a form of a sawtooth and the second second interface is flat, an amount of light deflected in the direction difficult to cause the reflection at the second interface (for instance, the light beam c in FIG. 3) is very small, and accordingly, it is further preferable from the viewpoint of light efficiency.

The existence of the first interface permits the total reflection at the second interface of a part of light incident to the optical member. Further, by changing the shape of the first interface, it is possible to control an amount of light reflected at the second interface.

The magnitude of the vertical angle of the prism array 2 and the refractive index of the prism array are factors for determining the total reflection. By optimizing these conditions, it is possible to control the reflection and the transmission in a desired range of angle. From this point, it is preferable that the vertical angle of the prism array is 60°–170°.

The prism of the prism array may be asymmetric with respect to a face. Namely, vertical angles α and β may be different from each other with respect to the vertical direction of the surface of the prism array as shown in FIG. 4. It is possible to change the direction of viewing angle of transmitting light to have a desired angle by controlling the vertical angles α and β.

For normalizing the intensity of light in the surface direction as much as possible, it is preferable to set a shorter pitch of the wavy interface or bigger angle of the wavy interface in a portion that is positioned in a surface direction at longer distance from the side light source which is located at one side surface of the prism array.

But, it is further preferable to set a longer pitch of the wavy interface or smaller angle of the wavy interface of prism array positioned at the much closer surface region to the end of the prism array.

Because there are end-reflectors at the end of the prism array, so the end-reflectors will function as a virtual light source. And it is preferable to weaken the effect of the side light source or the end-reflectors in the end or near-end region of surface in prism array.

Further, an anti-reflection coating may be formed on the surface of the prism array. For instance, at least one layer of dielectric film having a thickness of the order of visible light wavelength is formed on the surface of the prism. Thus, the transmission of light under the above-mentioned conditions can be further increased.

For the promotion of re-use of light, the prism array 2 may be a concentric circular array. In the present invention, since an incident light having a certain incident angle or larger with respect to the direction perpendicular to the longitudinal direction of the prism array is re-used for scattering, use of the concentric circular array as a prism array enables the re-use of light having the certain incident angle or larger in all directions in order to cause scattering.

Figure 7A:
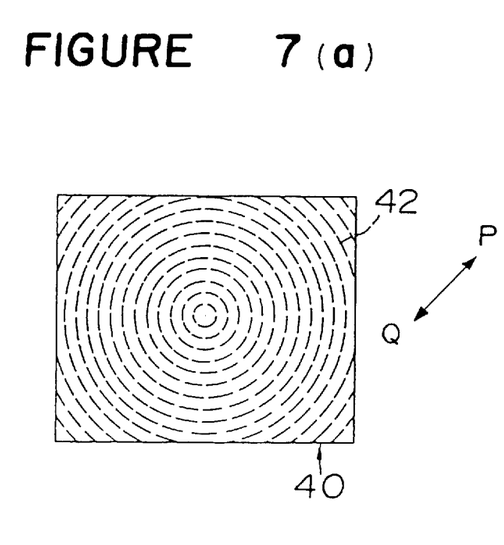
FIGS. 7(a) and 7(b) are schematic views showing arrangement of a prism array used for the present invention.
Figure 7B:
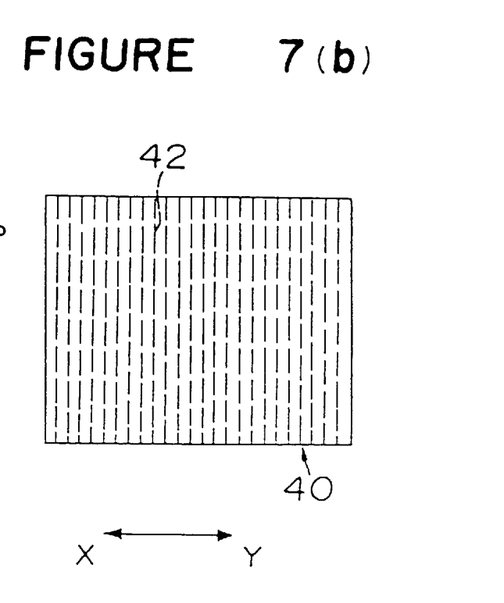

The behavior of light in the above case is shown in FIG. 7(a). FIG. 7(a) is a view from an upper part of a display device 40 wherein numeral 42 designates a vertical angle portion of the prism array. The direction of X–Y in FIG. 7(b) is the direction perpendicular to the longitudinal direction of the prism array.

Similarly, for the promotion of the re-use of light, two prism arrays are overlapped so that the longitudinal directions of prism arrays cross at a substantially right angle.

In other words, double layered prism arrays, 90° crossed two prism arrays, for example, are preferable in viewpoint of the light efficiency to the pyramid type prism array patterned in single layer.

Because an incident light coming into the prism arrays will be reflected at the wavy interface of either prism array or both prism arrays.

In the present invention, the viewing angle in the direction perpendicular to the longitudinal direction of the prism array 2 is restricted. This results because for the re-use of light in that portion, the light of that portion is reflected even when the transparent-scattering type display element is in a transparent state, and little amount of light reaches the light absorbing plate.

In the same manner as above, in order to positively re-using light, it is preferable to arrange two prism arrays in an overlapping state wherein the direction of the deflection of the first interfaces of the prism arrays are perpendicular to each other. The construction of the arrangement will be described.

A prism array functions for light (external light) incident from the side of a saw-tooth like interface so that a part of light incident within a predetermined angle range is permitted substantially to pass through and the other light having an incident angle other than the predetermined angle range is substantially reflected. Namely, the prism array has a selective deflecting function to the external light incident to a surface perpendicular to a non-periodic direction of the first interface (for instance, the direction perpendicular to the direction of a continuous line of triangular waves) which reflects light.

On the other hand, the prism array does not substantially reflect a portion of incident light on the opposite surface, and has little selective deflecting function to the external light.

Accordingly, a light component incident to a surface having the periodical change in the first interface of the prism array is substantially employed as a re-use of light. Therefore, two prism arrays are used in an overlapping state. When the prism array at the side of the display element is referred to as the A prism array, and the array at the side of the light absorbing is referred to as the B prism array, light which has passed through the A prism array at the front side without subjecting to selective deflection by the A prism array is substantially deflected or allowed to pass through by the B prism array. Accordingly, the efficiency of utilization of light is remarkably improved as a whole.

Also in the present invention, the prism array may be arranged so that the longitudinal direction of the array extends obliquely to the display surface, in order to expand the viewing angle in the vertical and lateral directions. Namely, the prism array is disposed so that the longitudinal direction corresponds to a P–Q direction in FIG. 7(b).

In a preferred embodiment of the present invention, a light source is disposed at a side face of the optical member. This occurs because a bright display is obtainable by increasing an amount of scattering light when the transparent-scattering type display element is in a scattering state.

Figure 2:
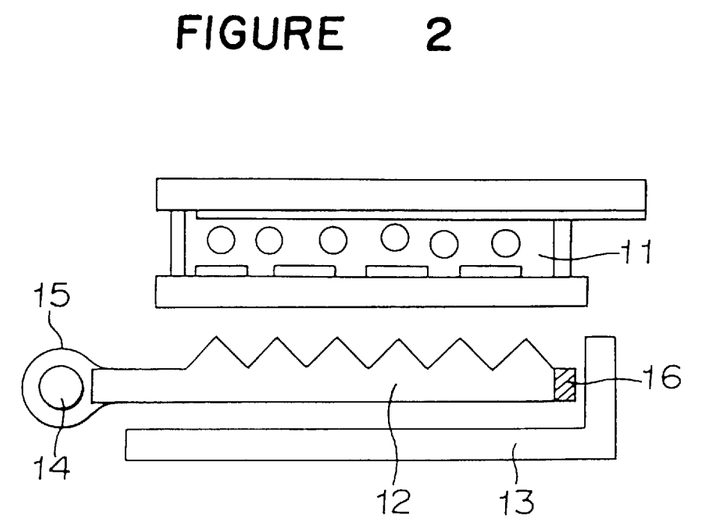
FIG. 2 is a cross-sectional view showing another embodiment of the display device of the present invention.

FIG. 2 is a cross-sectional view showing the preferred embodiment. A prism array 12 is disposed at the back side of a transparent-scattering type display element 11. The prism array 12 is so disposed that a sawtooth-like face directs to the transparent-scattering type display element 11. Further, a light absorber 13 is disposed at the back side of the prism array 12. Different points from FIG. 1 are such that a light source 14 is disposed at a side face of the prism array 12, and a reflector 16 is provided at the opposite side of the light source with respect to the prism array 12. A reflector 15 is disposed at the back side of the light source 14 so as to introduce efficiently illuminating light from the light source 14 to the prism array 12.

In this case, the prism array 12 serves as a light guide of the illuminating light from the light source 14. In the illuminating light from the light source 14, light which satisfies the condition of total reflection of the flat interface of the prism array 12 is reflected at the flat interface and emits from the sawtooth-like interface. On the other hand, light which does not satisfy the condition of total reflection at the flat interface of the prism array 12 emits from the flat interface of the prism array and is absorbed by the light absorber 13. Accordingly, the substantial amount of light does not emit forward the transparent-scattering type display element 11.

In the conspicuous feature of the construction, the light within the viewing angle at the time of transmittance does not substantially increase. Since an amount of the light reaching the eyesight of the observer is small, the contrast ratio of a display is not substantially reduced.

As the light source, an ordinary cold cathode discharge lamp (tube) or the like may be used. Further, as the reflector, an aluminum film, a silver film or the like having a high reflectance may be used.

In the present invention, the transparent-scattering type display element is used as a direct view type display device. However, the transparent-scattering type display element itself cannot satisfactorily provide a monochrome image. In this point, it is remarkably different from a TN (twisted nematic) type or a STN (supertwisted nematic) type which is a conventionally used transparent-absorption type liquid crystal element. Namely, the conventional type element can provide a monochrome image without using special optical devices. On the other hand, the transparent-scattering type display element cannot provide a monochrome image unless special optical devices are used.

Accordingly, use of the transparent-scattering type element as a projection type rather than a direct view type makes the construction of the device simple. Since it permits joint use of a projection optical system such as a lens, an aperture or the like, a desired display characteristic such as a high contrast ratio can be obtained due to the associated function of the optical system and the display element. Therefore, the optimization of a liquid crystal and solidified material composite as a typical example of the transparent-scattering type display element to the projection optical system is relatively progressing.

On the contrary, when the direct view type display device is prepared with use of the transparent-scattering type element, there is a problem as to how the device is constituted. In order to make the device compact, there is a restriction that the optical devices as used in the projection type cannot be used. Accordingly, in the direct view type display device, the electro-optical characteristics of the transparent-scattering type display element is apt to reflect as the display characteristics. On the other hand, the optimization of the transparent-scattering type optical element on the direct view type is not so progressing in comparison with the projection type.

The present invention is to propose a simple construction suitable as a direct view type element, which can achieve a brighter display than conventional liquid crystal display elements.

Transparent-scattering type display element of the present invention is sufficient for use as far as transparent and scattering states can be controlled artificially with a layer of a transparent-scattering optical material. In particular, use of liquid crystal is preferable because of a low power consumption and high reliability. More preferably, the most preferable element is such that a liquid crystal and solidified matrix composite layer in which liquid crystal is contained dispersively in a solidified matrix is disposed between a pair of substrates with electrodes, and a scattering state and a transparent state are controlled by applying a voltage.

The liquid crystal and solidified matrix composite layer of the transparent-scattering type display element in which the liquid crystal and solidified matrix composite layer is held can be used as far as the liquid crystal is contained dispersively in the solidified matrix. In more detail, the liquid crystal may be of individual droplets which are sealed in the form of microcapsules, or these droplets may be connected to each other, or the liquid crystal may be filled in holes of the solidified matrix having a large number of fine holes.

The liquid crystal and solidified material composite layer is interposed between a pair of substrates with electrodes. When a voltage is applied across the electrodes, the refractive index of the liquid crystal is changed depending on a state of the application of the voltage. Then, the relation between the refractive index of the solidified matrix and the refractive index of the liquid crystal is changed. When the refractive indexes coincide with each other, a transparent state (incident light propagates straight) is provided, and when the refractive indexes are different from each other, a scattering state (incident light is scattered) is provided.

Specifically, the refractive index of cured solidified material which forms the solidified material matrix coincides with the ordinary refractive index ($n_0$) of the liquid crystal in a state of the application of the voltage.

Accordingly, when the refractive index of the solid material obtained coincides with the refractive index of the liquid crystal, light is transmitted, and when the refractive indexes do not coincide, light is scattered (opaque). Since the scattering property of the element is higher than a conventional DSM (dynamic scattering mode) type transparent-scattering type display element, a high ON-OFF ratio in transmission and scattering is obtainable.

The liquid crystal and solidified material composite layer can be formed as follows. A mixture of liquid crystal and raw material for the solidified material matrix is prepared. It is cast on electrode substrates to cure it. Alternatively, the peripheral portion of a pair of substrates with electrodes is sealed with a sealing material in the same manner as preparing an ordinary liquid crystal cell, and the mixture is injected from an injection port to cure the mixture. Thus, the liquid crystal is contained dispersively in the solidified material matrix.

As the solidified material matrix, there are resin matrix, ceramic matrix and so on. However, use of the resin matrix is preferred because it is easy to manufacture and the adjustment of the refractive index is easy.

As a raw material for the resin matrix, a photo-curable resin or a thermo-settable compound which is curable in an enclosed system is used. Solution obtained by dissolving the compound in the liquid crystal is cured by light or heat. In this manner, the before-mentioned casting method or injection method can be used with good productivity. In particular, a method of preparation with use of the photo-curable compound is preferred.

In the curing step of the element, if the curing is conducted in a state that a sufficiently high voltage is applied to a specified portion of the element, or a state that the element is heated at a temperature higher than the phase point of liquid crystal, that portion can be rendered to be a normally light transmitting state. If the curing is conducted by applying an intermediate voltage or the portion is semi-cured in a state that a sufficiently high voltage is applied, and thereafter, the curing is completed without the application of the voltage, a display of desired half tone (an arbitrary degree of scattering in a scattering time) can be obtained. With such measures, a partially fixed display such as a frame, characters and so on or a display of photograph images becomes possible.

Although it is preferable to use the transparent-scattering type liquid crystal display element in which the refractive index of the solidified material matrix coincides with the ordinary refractive index ($n_o$) of the liquid crystal used, and these refractive indexes are completely in agreement, it is usable as long as the refractive indexes substantially coincide with each other to the extent not to adversely affect the transparent state. The reason is as follows. The resin matrix swells in the presence of the liquid crystal, and the refractive index which the resin matrix itself originally has, approaches the refractive index of the liquid crystal. Accordingly, light can substantially transmit even though there is a slight difference between the refractive indexes.

In order to use the scattering type display element for a display device, the electrodes are subjected to patterning to have a predetermined pattern. However, an active element such as a thin-film transistor (TFT) or the like may be arranged for each pixel so that various displays are obtainable in the combination of dots. Use of the active element allowed a display of a high density. Although time-sharing driving is possible, it is difficult to drive at a high duty ratio. The reason is as follows. In the conventionally used super-twisted nematic element, a steep threshold characteristic in the voltage-transmittance characteristic is obtainable by using polarizing plates or the like. However, in the transparent-scattering type display element, the scattering state and the transparent state are defined by the change of refractive index based on the state of orientation of the liquid crystal. Accordingly, it is difficult to obtain the steep threshold characteristic in the voltage-transmittance characteristic.

Generally, transparent electrodes are used for the electrodes to drive the substrates. However, a non-transparent electrode such as metal may be jointly used at a part thereof for the purpose of a lead wire having a low resistance. Further, a protection plate such as a glass plate, a plastic plate or the like may be laminated on a front face or a back face of the transparent-scattering type display element. In addition, a color filter may be laminated for the adjustment of color, or a multi-colored display pattern can be obtained by using a color filter or a colored illumination.

As a raw material for the solidified material matrix, in particular, the resin matrix which forms the before-mentioned liquid crystal and solidified material composite layer, there are monomer or oligomer of various kinds of resin, polymer dissolved by solvent or the like, which are used as a mixture mixed with liquid crystal. In this case, it is preferable to use homogeneous solution obtained by dissolving the raw material of solidified material matrix in the liquid crystal. However, a mixture in a latex may be used.

When the mixture is cast on a substrate, the solvent may be distilled off or a by-product such as gas may be produced in the solidified material. However, when the liquid crystal is introduced into a cell followed by curing, it is unnecessary to distill off the solvent in an enclosed system and a curable mixture is used without producing the by-product such as gas at the time of curing.

Accordingly, as mentioned before, it is preferable to use the photo-curable compound, in particular, a photo-curable vinyl type compound from the viewpoint of productivity. Specifically, a photo-curable acryl type compound is exemplified. In particular, it is preferable to use an acryl oligomer-containing compound which is polymerized and cured by irradiating light.

As the liquid crystal used in these cases, there are a nematic liquid crystal, a smectic liquid crystal or the like, which may be used solely or in a form of composition. However, in order to satisfy various kinds of requisite performance such as a working temperature range, a working voltage and so on, it can be said to use the composition. In particular, use of the nematic liquid crystal is preferred.

When the photo-curable compound is used with liquid crystal for constructing the liquid crystal and solidified material composite layer, it is preferable to dissolve uniformly the photo-curable compound. The cured material after exposure to light cannot be dissolved or is hardly dissolved. When the composition is used, it is preferable to use each liquid crystal having a closer value in solubility.

The refractive index of the liquid crystal used in the present invention is an important parameter in the control between a scattering state and a transparent state. In particular, the birefringence $\Delta n$ of the liquid crystal is a major factor for determining the scattering characteristic in an OFF time. Accordingly, $\Delta n$ should be 0.2 or more, preferably 0.22 or more. Further, when the thickness of the liquid crystal-solidified material matrix composite (gap between electrodes: cell gap) is larger than a predetermined value, there is obtainable a function to diffuse light toward the forward direction with a wide angle or backwardly in a multi-scattering state (scattering in many times in a light path) when the scattering of light is produced in a small area. Accordingly, d is an important factor to determine a direct view type display characteristic (in particular, the brightness of white in scattering: reflectance).

In order to effectively use the multi-scattering, (1) the filling rate of liquid crystal should be high and (2) the cell gap should be sufficiently larger than the cross-sectional surface area of scattering at each portion of the liquid crystal dispersed.

From the condition of (1), it is desirable for the filling rate of the liquid crystal to contain the liquid crystal of 50 wt % or higher to the whole amount of the liquid crystal and solidified material composite. When the filling rate of the liquid crystal is too high, a state that the dispersed liquid crystal is connected as a whole is provided, whereby the scattering characteristic is reduced. Accordingly, the filling rate should be 80 wt % or lower. This means that a state closer to the highest filling rate is desired.

From the condition of (2), it is desired to determine the cell gap d as follows. When the size of the liquid crystal R (when the liquid crystal is in a form of particle, the size indicates the diameter, or when the liquid crystal is connected, it indicates the correlation length of the director of the liquid crystal: generally, it is called domain size) in the liquid crystal of Δn is 0.5–4 μm, a suitable condition is provided from the viewpoint of the scattering characteristic of light. The cross-sectional surface area of scattering to the cross-sectional surface area determined by R is about 2–4 times. Accordingly, it is preferable to be about d>3R (μm) in order to obtain a plurality of turns of scattering (multi-scattering) in the cross-sectional area of scattering. Further, in the relation of d to Δn of the liquid crystal, it is preferable to be d>2/Δn (μm). When d is small, there is little phase difference of light in the element, whereby an amount of scattering due to the phase difference of light tends to be reduced. These formulas concern a visible light.

EXAMPLE 1

Examples of the present invention will be described with reference to FIG. 1.

As the transparent-scattering type display element, an element in which a liquid crystal and solidified material matrix composite is held between glass substrates 4 each being provided with a transparent electrode (ITO) was prepared. The transparent electrode 5 was patterned into 7 segments. The electrodes were statically driven. As conditions for driving, 60 Hz and a rectangular wave were used.

The liquid crystal and solidified material composite is a liquid crystal polymer composite (LCPC) using an acryl type resin as a material for the matrix. Specifically, a nematic liquid crystal (fluorine type liquid crystal base, Δn=0.22, Δε=10.5, Tc=80° C., viscosity η=22 cSt: all values being measured at 25° C.), bifunctional urethanacrylate oligomer (molar weight=about 3000), acrylate monomer and photo-polymerization initiator were dissolved at 65:17:18:1 in weight ratio. The solution was injected to a cell whose cell gap was 13 μm, and then, it was subjected to exposure to UV rays. Thus, the liquid crystal polymer composite was formed. A prism array having a vertical angle of 100°, an array pitch of 31 μm and made of polycarbonate was used.

As the absorbing plate, a commercially available black paper was used.

When the liquid crystal polymer composite was in a scattering state and without using the prism array, the reflectance was only about 20%. However, when the prism array was used, the reflectance was remarkably increased as about 34%. When the element with the prism array was driven with a driving voltage of 6V, the contrast ratio became about 12:1, and a very bright display device could be realized.

EXAMPLE 2

The same structure as Example 1 except that an antireflection coating of $SiO_2$ was formed on both surfaces of the prism array, was formed. This reduced reflection at the front surface of the prism array. When the liquid crystal and polymer composite was in a transparent state, the brilliance of black became very small. Since a substantial change of the reflectance at the time of scattering was not found, the contrast ratio became as large as 18:1.

EXAMPLE 3

The same liquid crystal and polymer composite as in Example 1 except that a prism array having the shape of the short side being flat as shown in FIG. 2 was used. Each prism had a vertical angle of 120° and was arranged symmetrically in the left and right directions at a pitch of 31 μm. As a material for the prism, polycarbonate was used. A linear cold cathode tube was disposed at a side face of the short side of the prism array. The cold cathode tube was covered with a silver reflecting plate at the opposite side of the side face of the prism array so that light was incident into the side face of the prism array. A silver reflecting plate was disposed at three side faces of the prism array except for the side face where a light source was disposed. An absorbing plate was disposed at the back side of the prism array. As the absorbing plate, a plastic plate containing a black absorbing agent was used, and an anti-reflecting treatment was conducted to the surface facing the prism array.

When the cold cathode tube was not operated, the reflectance was increased 10% in comparison with the case in which there was no prism array. When the cold cathode tube was operated, light was emitted at an angle of 70° with respect to the direction perpendicular to the face of the prism array. When the liquid crystal and resin composite is in a transparent state, light passes through the liquid crystal and polymer composite. Since an observer is in the vertical direction to the liquid crystal and polymer composite (LCPC layer), he does not substantially observe light from the liquid crystal and polymer composite. When the liquid crystal and polymer composite is in a scattering state, light emitting from the prism array is scattered. Accordingly, the observer can observe the scattering light. As a result, it was possible to recognize a display even in circumstances that an outer light is little and it is dark. In this case, the contrast ratio was 16:1.

EXAMPLES 4 to 11

Experiments were conducted by changing the combination of the above-mentioned elements. Results are shown in Table 1.

In the present invention, the optical measurement on reflectance is performed under a method in accordance with JIS Z 8722 D-0 (test point at angle 0°). The measurement error is about ±10%.

It is noted that JIS Z 8722 D-0 is substantially equivalent to ISO7724/1 or DIN5033/TEIL7 having test point at angle 8°. The luminance values are relatively calculated on the basis of the measured reflectance values. The contribution of side light source is about 60 cd/m² in these examples.

TABLE 1

|  | Contrast Ratio | Reflectance [%] | Luminance [cd/m²] | Prism Array | | | AR coat on Prism | Light Source |
|---|---|---|---|---|---|---|---|---|
|  |  |  |  | config | angle [°] | pitch [μm] |  |  |
| Comparative Example 1 | 10:1 | 20 | 42 | \ | \ | \ | \ | \ |
| 1 | 12:1 | 34 | 68 | V · S | 100° | 31 | — | — |
| 2 | 18:1 | 34 | 64 | V · S | 100° | 31 | Y | — |

TABLE 1-continued

|   | Contrast Ratio | Reflectance [%] | Luminance [cd/m$^2$] | Prism Array config | angle [°] | pitch [μm] | AR coat on Prism | Light Source |
|---|---|---|---|---|---|---|---|---|
| 3 | 16:1 | 30 | 118 | W · S | 120° | 31 | — | Y |
| 4 | 10:1 | 45 | 93 | V · D | 60° | 31 | — | — |
| 5 | 14:1 | 48 | 98 | V · D | 120° | 270 | Y | — |
| 6 | 10:1 | 34 | 124 | W · S | 100° | 270 | — | Y |
| 7 | 8:1 | 48 | 160 | W · D | 100° | 270 | — | Y |
| 8 | 12:1 | 25 | 115 | W · S | 170° | 270 | — | Y |
| 9 | 10:1 | 28 | 118 | W · S | 130° | 270 | — | Y |
| 10 | 10:1 | 27 | 115 | W · S | R-lens | 270 | — | Y |
| 11 | 15:1 | 49 | 165 | W · D | 100° | 31 | Y | Y |

Note
<Prism Array>
material: polycarbonate, n ≈ 1.59
$d_t$ of type 1 (V) prism array ≈ 300 μm
$d_t$ of type 2 (W) prism array ≈ 3300 μm
D: 90° crossed two Prism arrays
one light source located in bottom side prism array
S: one prism array
R-lens: cylindrical lens type in FIG. 8(b)
Y: applied
—: not applied
<Light Source>
3W cold cathode discharge lamp (tube)

INDUSTRIAL APPLICABILITY

In accordance with the present invention, when a direct view type display device using a transparent-scattering type display element is used, it is possible to reflect for re-use light having the direction other than a specified viewing angle direction when a white image is provided, whereby the efficiency of utilization of light can be improved.

Further, when a light absorbing means is so arranged as to extend over the substantially entire surface of an optical element, light is prevented from reaching an observer when a black image is provided, whereby a display device having a high contrast ratio can be obtained.

Further, when the optical member is so constructed that it has a first interface and a second interface in this order from the side of the transparent-scattering type display element wherein the first interface is to deflect the direction of at least part of light among incident lights so that the angle formed in association with the display surface of the transparent-scattering type display element is small, and the second interface is to substantially reflect light entering from the direction that the angle formed in association with the transparent-scattering type display element is smaller than a predetermined angle while it substantially transmits the other light, there is an advantage to adjust an amount of reflection light at the second interface by controlling the shape of the first interface.

Further, by disposing a light source at a side face of the optical member, the brightness at the time of providing a white image can be further increased, and at the same time the reduction of the contrast ratio can be prevented.

Further, when the transparent-scattering type display element is formed of a liquid crystal and solidified material matrix composite having a high ON-OFF ratio of transmittance and scattering, the contrast ratio of a display device can be increased.

Further, by separating the optical member from an absorber, it is unnecessary to form an absorbing face in the optical member, and accordingly, mass production is possible with a smaller cost.

We claim:

1. A display device comprising:
    a transparent-scattering type display element in which light scattering characteristics are changed in response to an external input;
    an optical member disposed at a back side of the transparent-scattering type display element, which substantially transmits light which passes through the transparent-scattering type display element within a predetermined range of an incident angle, and substantially reflects other light; and
    a light absorber disposed at the back side of the optical member;
    wherein the optical member comprises two parts in an overlay relation.

2. The display device according to claim 1, wherein said two parts of the optical member are overlapped so that their longitudinal directions cross at substantially a right angle.

3. The display device according to claim 2, wherein said optical member includes at least one prism array.

* * * * *